(12) United States Patent
Chawla et al.

(10) Patent No.: US 10,942,845 B2
(45) Date of Patent: Mar. 9, 2021

(54) INLINE COALESCING OF FILE SYSTEM FREE SPACE

(71) Applicant: EMC IP Holding Company LLC, Hopkinton, MA (US)

(72) Inventors: Rohit Chawla, Scotch Plains, NJ (US); Ahsan Rashid, Edison, NJ (US); Kumari Bijayalaxmi Nanda, Edison, NJ (US); Alexander S. Mathews, Morganville, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/883,701

(22) Filed: Jan. 30, 2018

(65) Prior Publication Data

US 2019/0236002 A1 Aug. 1, 2019

(51) Int. Cl.
*G06F 12/02* (2006.01)
*G06F 12/0891* (2016.01)

(52) U.S. Cl.
CPC ...... *G06F 12/0238* (2013.01); *G06F 12/0269* (2013.01); *G06F 12/0891* (2013.01); *G06F 2212/1024* (2013.01); *G06F 2212/1044* (2013.01); *G06F 2212/163* (2013.01); *G06F 2212/608* (2013.01)

(58) Field of Classification Search
CPC ............ G06F 12/0238; G06F 12/0269; G06F 12/0891; G06F 2212/1024; G06F 2212/1044; G06F 2212/163; G06F 2212/608
See application file for complete search history.

(56) References Cited

U.S. PATENT DOCUMENTS

| | | | |
|---|---|---|---|
| 9,317,213 B1* | 4/2016 | Gupta ................. | G06F 3/064 |
| 9,430,503 B1 | 8/2016 | Delgado et al. | |
| 9,720,596 B1 | 8/2017 | Bono et al. | |
| 9,864,753 B1 | 1/2018 | Armangau et al. | |
| 2013/0282953 A1* | 10/2013 | Orme ................. | G06F 12/0238 |
| | | | 711/102 |
| 2016/0179678 A1* | 6/2016 | Camp ................. | G06F 12/0855 |
| | | | 711/103 |

* cited by examiner

*Primary Examiner* — David Yi
*Assistant Examiner* — Dustin B. Fulford
(74) *Attorney, Agent, or Firm* — BainwoodHuang

(57) ABSTRACT

An in-line (or foreground) approach to obtaining contiguous ranges of free space in a file system of a data storage system that can select windows having blocks suitable for relocation at a time when one or more blocks within the respective windows are freed or de-allocated. By providing the in-line or foreground approach to obtaining contiguous ranges of free space in a file system, a more efficient determination of windows having blocks suitable for relocation can be achieved, thereby conserving processing resources of the data storage system.

13 Claims, 5 Drawing Sheets

INLINE COALESCING OF FILE SYSTEM FREE SPACE

BACKGROUND

Conventional data storage systems typically include one or more storage processors coupled to one or more arrays of non-volatile storage devices, such as, for example, magnetic disk drives, electronic flash drives, and/or optical drives. The storage processors are configured to service IO requests generated by host computers that specify files, blocks, or other data elements to be created on, read from, written to, and/or deleted from the respective arrays of non-volatile storage devices. The storage processors execute software that manages the incoming IO requests, and performs various data processing tasks to organize and secure the files, blocks, or other data elements on the non-volatile storage devices.

Such data storage systems commonly employ redundant array of independent disks (RAID) technology to protect the data they service. A single data storage system typically includes multiple RAID groups, in which each RAID group is formed from one or more disk drives. In some arrangements, the disk drives that participate in a RAID group are divided into segments to form multiple RAID stripes across corresponding segments on different disk drives. Further, one or more of the segments in a RAID stripe are typically designated for storing parity information. In the event of a disk failure that damages one of the segments in the RAID stripe, the RAID group reconstructs the damaged segment using the data and parity information from the remaining segments of the RAID stripe. Segments in RAID stripes are typically arranged to promote fast disk access, such as, for example, by interleaving access to segments in RAID stripes on different disk drives, thereby improving overall data storage system performance.

SUMMARY

Disk utilization in data storage systems can be improved by a technique that maps data corresponding to diverse logical addresses of a file to contiguous physical addresses, providing contiguous ranges of data having lengths equal to that of one or more full RAID stripes of a RAID group. As a result, data storage systems can write contiguous data to the RAID group with increased efficiency using full-stripe writes. This technique relies on a data storage system with a file system that has readily available contiguous ranges of free space for receiving full-stripes worth of data.

An off-line (also referred to herein as "background") approach to obtaining such contiguous ranges of free space in a file system involves relocating allocated blocks within a range of a physical address space of the file system. One or more slices of storage space within the range of the physical address space are selected as including one or more windows having blocks suitable for relocation. The range of contiguous free blocks has a length that corresponds to one or more full stripes of a RAID group storing content of the file system. In response to receiving an IO request containing data to be written to the file system, the file system arranges the data in the range of contiguous free blocks, and performs one or more full-stripe writes to write the data to the RAID group.

To supplement the off-line or background approach, an in-line (also referred to herein as "foreground") approach to obtaining contiguous ranges of free space in a file system is disclosed herein that selects windows having blocks suitable for relocation at a time when one or more blocks are freed (or de-allocated) within the respective windows. For example, blocks may originally be written as log structured data onto a first window, and subsequent modifications to (or overwrites of) these blocks may be written as log structured data onto a second window, resulting in corresponding locations of the respective blocks in a virtual volume to be overwritten and needing to be unmapped and freed. Because modifications to (or overwrites of) the respective blocks were written onto the second window, the blocks originally written onto the first window are no longer valid and are freed or de-allocated. In this way, a fragmented window is created as a candidate for cleaning. In the in-line or foreground approach, a determination is made as to whether the first window has any remaining blocks suitable for relocation at the time the block(s) within the first window are freed or de-allocated. By supplementing the off-line or background approach to obtaining contiguous ranges of free space in a file system with the in-line or foreground approach, a more efficient determination of windows having blocks suitable for relocation can be achieved, thereby conserving processing resources of the data storage system.

In certain embodiments, a method of obtaining at least one contiguous range of free space in a file system of a data storage system includes, in a foreground process, receiving a first write request at the data storage system. The data storage system includes a persistent cache. The method further includes, in response to the first write request, writing one or more first blocks as log structured data to a first window of the persistent cache, thereby causing one or more second blocks to be overwritten and freed in a second window of the persistent cache. The method still further includes, once the one or more second blocks in the second window are freed, determining whether the second window has a number of remaining allocated blocks that is less than a first predetermined threshold value, and, having determined that the number of remaining allocated blocks in the second window is less than the first predetermined threshold value, relocating the remaining allocated blocks to evacuate the second window. The method also includes, upon receipt of a second write request at the data storage system, writing one or more third blocks as log structured data to the second window.

In certain arrangements, the data storage system includes a plurality of slices of data storage, and the method further includes, in a background process, selecting, at one or more intervals, a respective slice from among the plurality of slices, and relocating blocks from among one or more windows of the respective slice to evacuate the one or more windows.

In certain further embodiments, a data storage system includes a memory configured to store a first set of instructions pertaining to an in-line space maker, a persistent cache, and a storage processor configured to execute, in a foreground process, the first set of instructions (i) to receive a first write request at the data storage system, the data storage system including a persistent cache, (ii) in response to the first write request, to write one or more first blocks as log structured data to a first window of the persistent cache, thereby causing one or more second blocks to be overwritten and freed in a second window of the persistent cache, (iii) once the one or more second blocks in the second window are freed, to determine whether the second window has a number of remaining allocated blocks that is less than a first predetermined threshold value, (iv) having determined that the number of remaining allocated blocks in the second window is less than the first predetermined threshold value, to relocate the remaining allocated blocks to evacuate the second window, and (v) upon receipt of a second write request at the data storage system, to write one or more third blocks as log structured data to the second window.

In certain arrangements, the data storage system includes a storage pool including a plurality of slices of data storage. The memory is further configured to store a second set of instructions pertaining to an off-line space maker, and the storage processor is further configured to execute, in a background process, the second set of instructions (i) to select, at one or more intervals, a respective slice from among the plurality of slices, and (ii) to relocate blocks from among one or more windows of the respective slice to evacuate the one or more windows.

Other features, functions, and aspects of the invention will be evident from the Detailed Description that follows.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

An in-line (or foreground) approach to obtaining contiguous ranges of free space in a file system of a data storage system is disclosed herein that can select windows having blocks suitable for relocation at a time when one or more blocks within the respective window are freed or de-allocated. By providing the in-line or foreground approach to obtaining contiguous ranges of free space in a file system, a more efficient determination of windows having blocks suitable for relocation can be achieved, thereby conserving processing resources of the data storage system.

Figure 1:
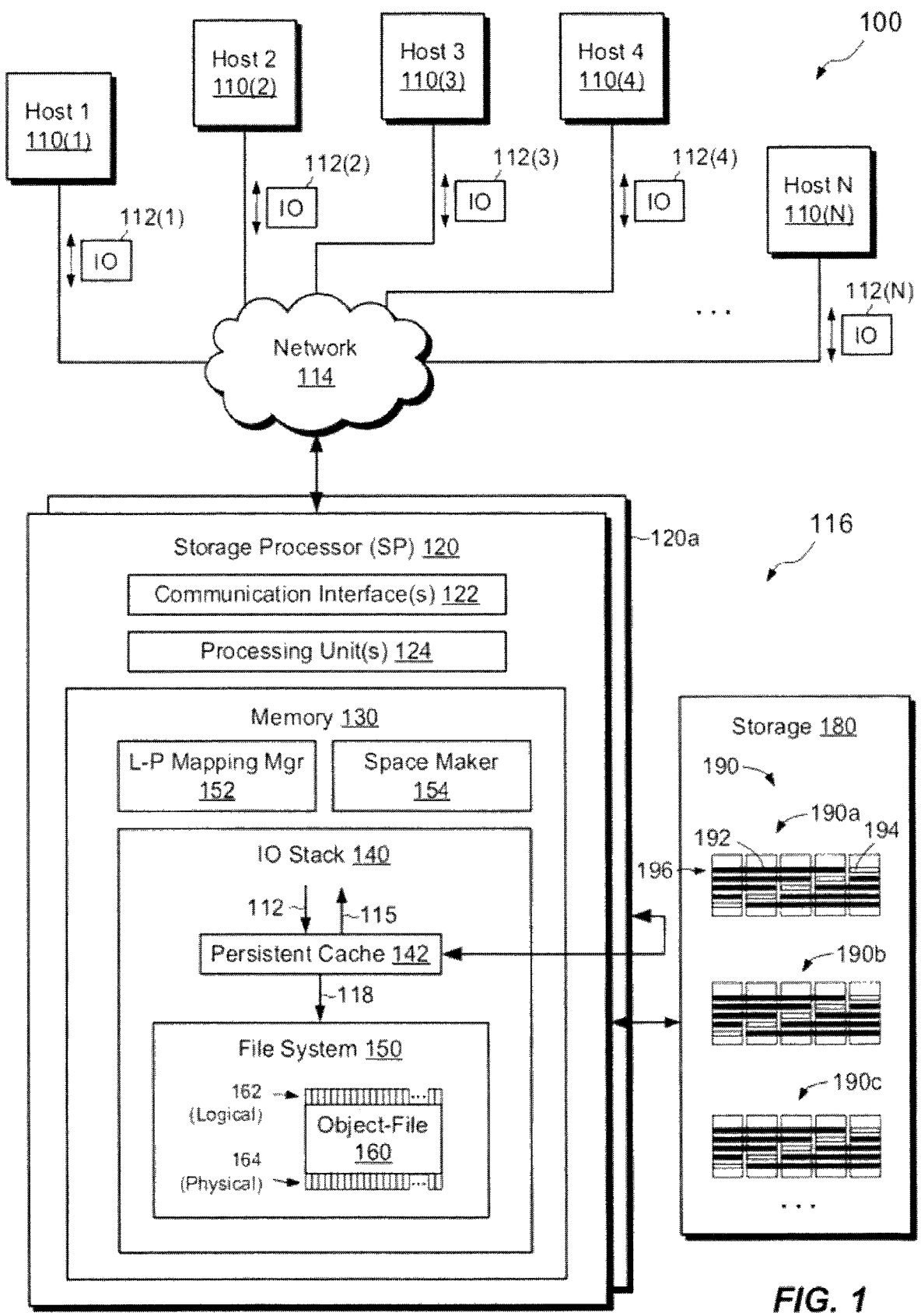
FIG. 1 is a block diagram of an exemplary environment in which an off-line (or background) approach and an in-line (or foreground) approach to obtaining contiguous ranges of free space in a file system of a data storage system may be employed.

FIG. 1 depicts an illustrative embodiment of an exemplary environment 100 in which an off-line (or background) approach and an in-line (or foreground) approach to obtaining contiguous ranges of free space in a file system of a data storage system may be employed. Such an environment is described in U.S. patent application Ser. No. 14/674,566 filed Mar. 31, 2015 entitled COALESCING FILE SYSTEM FREE SPACE TO PROMOTE FULL-STRIPE WRITES, the disclosure of which is incorporated herein by reference in its entirety. As shown in FIG. 1, the environment 100 includes a plurality of host computers 110(1), . . . , 110(N) configured to access a data storage system 116 over at least one network 114. The data storage system 116 includes a storage processor (SP) 120 as well as storage 180. The data storage system 116 can include multiple storage processors like the storage processor 120, such as, for example, at least one additional storage processor 120a. It is noted that such storage processors can be provided as circuit board assemblies or "blades," which can plug into a chassis that encloses the storage processors. The chassis can have a backplane for interconnecting the storage processors. Additional connections can be made among the respective storage processors using cables. It is further noted that the data storage system 116 can include any suitable number of storage processors, each of which can be any suitable type of computing device capable of processing input/output (IO) requests provided by the plurality of host computers 110(1), . . . , 110(N).

As further shown in FIG. 1, the storage 180 can be configured as a plurality of redundant array of independent disks (RAID) groups 190a, 190b, 190c (collectively, 190), in which each RAID group 190a, 190b, 190c is composed of multiple disk drives. Such disk drives can include magnetic disk drives, electronic flash drives, optical drives, and/or other suitable type of disk drives. For example, each of the RAID groups 190 may include disk drives of a common type that provide similar performance. In one embodiment, each RAID group 190 can include five (5) disk drives. Further, each RAID group 190 can include five (5) stripes 196. It is noted, however, that each RAID group 190 can alternatively include up to thousands or more such stripes. In FIG. 1, each stripe 196 is illustrated as a horizontal band across all of the disk drives in a RAID group, and includes four (4) data segments 192 and a single parity segment 194. Such data segments can be of any suitable size, such as, for example, 64 kilobytes (KB), resulting in each stripe having a length of 256 KB (parity is generally not counted when measuring stripe length). Any other suitable RAID configuration can be employed, including RAID configurations having a different number of disk drives per RAID group, different numbers and/or sizes of data and/or parity segments, and/or different numbers of stripes. Further, any other suitable number of RAID groups can be provided, including a single RAID group.

Within the environment 100, the network 114 can be implemented as any type of network or combination of networks, such as, for example, a storage area network (SAN), a local area network (LAN), a wide area network (WAN), the Internet, and/or any other suitable type of network or combination of networks. The plurality of host computers 110(1), . . . , 110(N) can connect to the storage processor 120 using various technologies and protocols, such as, for example, Fibre Channel, iSCSI, NFS, SMB 3.0, and CIFS. Further, any suitable number of hosts computers 110(1), . . . , 110(N) can be provided, using any of the above protocols, some subset thereof, or any other suitable protocol. It is noted that Fibre Channel and iSCSI are block-based protocols, whereas NFS, SMB 3.0, and CIFS are file-based protocols. The storage processor 120 is configured to receive IO requests 112(1), . . . , 112(N) from the host computers 110(1), . . . , 110(N), respectively, according to either block-based or file-based protocols, and to respond to such IO requests 112(1), ..., 112(N) by writing to or reading from the storage 180.

The storage processor 120 can include one or more communication interfaces 122, one or more processing units 124, and memory 130. The communication interfaces 122 can include, for example, SCSI target adapters and network interface adapters for converting electronic and/or optical signals received over the network 114 to electronic form suitable for use by the storage processor 120. The processing units 124 can include one or more processing chips and/or assemblies. In one embodiment, the processing units 124 can include numerous multi-core central processing units (CPUs). The memory 130 can include volatile memory (e.g., random access memory (RAM)) and non-volatile memory (e.g., read-only memory (ROM), disk drives, solid state drives (SSDs)). The processing units 124 and the memory 130 can be configured to form control circuitry constructed and arranged to carry out various methods and functions, as described herein. The memory 130 can include a variety of software constructs realized in the form of executable instructions. When executed by the processing units 124, the instructions cause the processing units 124 to carry out operations specified by the software constructs. Although certain software constructs are specifically described herein, it is noted that the memory 130 can include many other software constructs, such as an operating system and various applications, processes, and/or daemons.

As shown in FIG. 1, the memory 130 can include an IO stack 140, a logical-to-physical (L-P) mapping manager 152, and a space maker 154. The IO stack 140 is configured to provide an IO path for the IO requests 112(1), ..., 112(N). The L-P mapping manager 152 is configured to provide mapping services for data objects to promote full-stripe writes. The space maker 154 is configured to perform block relocation and/or de-allocation to create contiguous free space for supporting such full-stripe writes. The IO stack 140 can include a persistent cache 142 and a file system 150, which can realize a data object in the form of an object-file 160. The data object can take the form of a logical unit number (LUN), a host file system, a virtual volume (VVOL), or any other suitable data object. The IO stack 140 can implement mapping to convert the IO requests 112(1) ... , 112(N) to corresponding reads and/or writes of the underlying object-file 160. The object-file 160 has a logical address space 162 and a set of associated physical addresses 164. In one embodiment, the logical address space 162 is a monotonic range of logical offsets into the object-file 160 tracked by an inode structure in the file system 150. The physical addresses 164 correspond to particular addresses of blocks that the file system 150 can use to store data of the object-file 160. Such physical addresses 164 can be identified by file system block number (FSBN). The persistent cache 142 can be implemented using dynamic random access memory (DRAM) or any other suitable memory. The DRAM of the persistent cache 142 can be mirrored to DRAM implemented on the storage processor 120a, and the DRAM on the respective storage processors can be backed-up by one or more batteries. The contents of the persistent cache 142 can therefore persist on at least two storage processors and remain intact in the event of a power failure. In this way, the persistent cache 142 can provide the speed characteristics of DRAM, while also providing persistence not normally found with DRAM.

In one mode of operation, the plurality of host computers 112(1), ..., 112(N) can issue the IO requests 112(1), ..., 112(N), respectively, to the data storage system 116. The storage processor 120 receives the IO requests 112(1), ..., 112(N) at the communication interfaces 122, and passes the IO requests 112(1), ..., 112(N) to the IO stack 140 for processing. The IO requests 112(1), ..., 112(N) specify data to be written to the data object (e.g., the object-file 160). For each of the IO requests 112(1), ..., 112(N), the persistent cache 142 stores the data specified in the respective IO request. The persistent cache 142 also provides an acknowledgment 115 (see FIG. 2) once the data specified in the respective IO request have been securely stored (e.g., saved to DRAM on the storage processor 120, and mirrored to DRAM on storage processor 120a). The acknowledgement 115, which indicates a successful completion of the IO request 112, propagates back to the originating host computer, i.e., one of the host computers 110(1), ..., 110(N). This mode of operation can be repeated for additional IO requests specifying additional data to be written to various locations of the object-file 160. The persistent cache 142 accumulates the data specified in the IO requests 112(1), ..., 112(N), for example, in the order received, and provides the acknowledgement 115 in response to each IO request.

The IO requests 112(1), ..., 112(N) can specify not only data to be written, but also the locations of the data to be written relative to the data object (e.g., the object-file 160). For example, if the data object is a LUN, then the IO request may specify the location of the data as an offset into the LUN. Further, if the data object is a file system, then the IO request may specify the location of the data by filename and an offset into the named file. The IO stack 140 can map such location indicators to a set of logical offsets within the object-file 160. The file system 150 can further map the set of logical offsets to physical addresses (among the physical addresses 164; see FIG. 1) of blocks at specified FSBNs. In some cases, the data to be written are directed to blocks that have already been allocated and mapped by the file system 150, such that the data writes prescribe overwrites of existing blocks. In other cases, the data to be written do not have any associated physical storage, such that the file system 150 must allocate new blocks to the object-file 160 to store the data.

While accumulating data from IO requests and out-of-band with the processing of particular ones of the IO requests 112(1), ..., 112(N), the persistent cache 142 can perform a flushing operation 118 (see FIG. 2) to send the accumulated data (or portions thereof) to the file system 150 for organizing and incorporating the data into the storage 180. Upon receiving the flushed data, the file system 150 can invoke the L-P mapping manager 152, which can make a determination as to whether to organize file mapping in such a way that promotes full-stripe writes. The L-P mapping manager 152 can make this determination selectively based on several factors, such as, for example, the amount of available contiguous free space in the RAID groups 190 (see FIG. 1), and the metadata processing workload currently being handled by the file system 150. If the L-P mapping manager 152 determines that no remapping should be performed based on current circumstances, then the file system 150 can process the data flushed from the persistent cache 142 in a typical manner, i.e., without regard to full-stripe writes.

If the L-P mapping manager 152 determines that mapping should be performed to promote full-stripe writes, then the L-P mapping manager 152 can direct the file system 150 to perform data and metadata operations to arrange the data being flushed from the persistent cache 142 in contiguous physical addresses. Specifically, the L-P mapping manager 152 can direct the file system 150 to allocate at least one range of contiguous free blocks (also referred to herein as a "window") using the off-line (or background) approach, in which the window has a length equal to or greater than that of a full-stripe (e.g., 256 KB or 512 KB). In the case of overwrites, the L-P mapping manager 152 can direct the file system 150 to update block pointers for the object-file 160 so that the logical addresses of the flushed data point to the physical addresses of the newly allocated window, rather than pointing to their original locations, which may be randomly distributed throughout the physical address space. Blocks pointed away from may be freed (or de-allocated) and made available for other uses. The L-P mapping manager 152 can then direct the file system 150 to write the flushed data to the newly allocated blocks in accordance with the updated mapping. Further, lower levels of the IO stack 140 can effect a write operation on an available full stripe of a RAID group (i.e., one of the RAID groups 190a, 190b, 190c) with data written to the stripe in the same order in which they are mapped in the physical addresses in the file system 150. The L-P mapping manager 152 can therefore convert data writes directed to arbitrary logical addresses in the object-file 160 into contiguous writes of full-stripe size, which the lower levels of the IO stack 140 can apply to the RAID groups 190 as full-stripe writes. It is noted that the L-P mapping manager 152 can coalesce data writes covering lengths greater than one full stripe. For example, the L-P mapping manager 152 may aggregate data being flushed from the persistent cache 142 into one or more windows having lengths equal to any integer number of full stripes. In this case, the lower levels of the IO stack 140 can perform multiple full-stripe writes on the remapped data.

It is further noted that the data storage system 116 can invoke the L-P mapping manager 152 when performing allocating writes, i.e., writes that enlarge the logical address space 162 (see FIG. 1) of the object-file 160. Such writes can cause the file system 150 to allocate new blocks for storing additional content, as well as add new block pointers to point to the newly allocated blocks. For example, the L-P mapping manager 152 can direct the file system 150 to allocate a range of blocks at contiguous physical addresses having a length equal to that of a full stripe or an integer number of full stripes. The lower levels of the IO stack 140 can then operate to effect full-stripe writes of the new data on the RAID groups 190.

Figure 2:
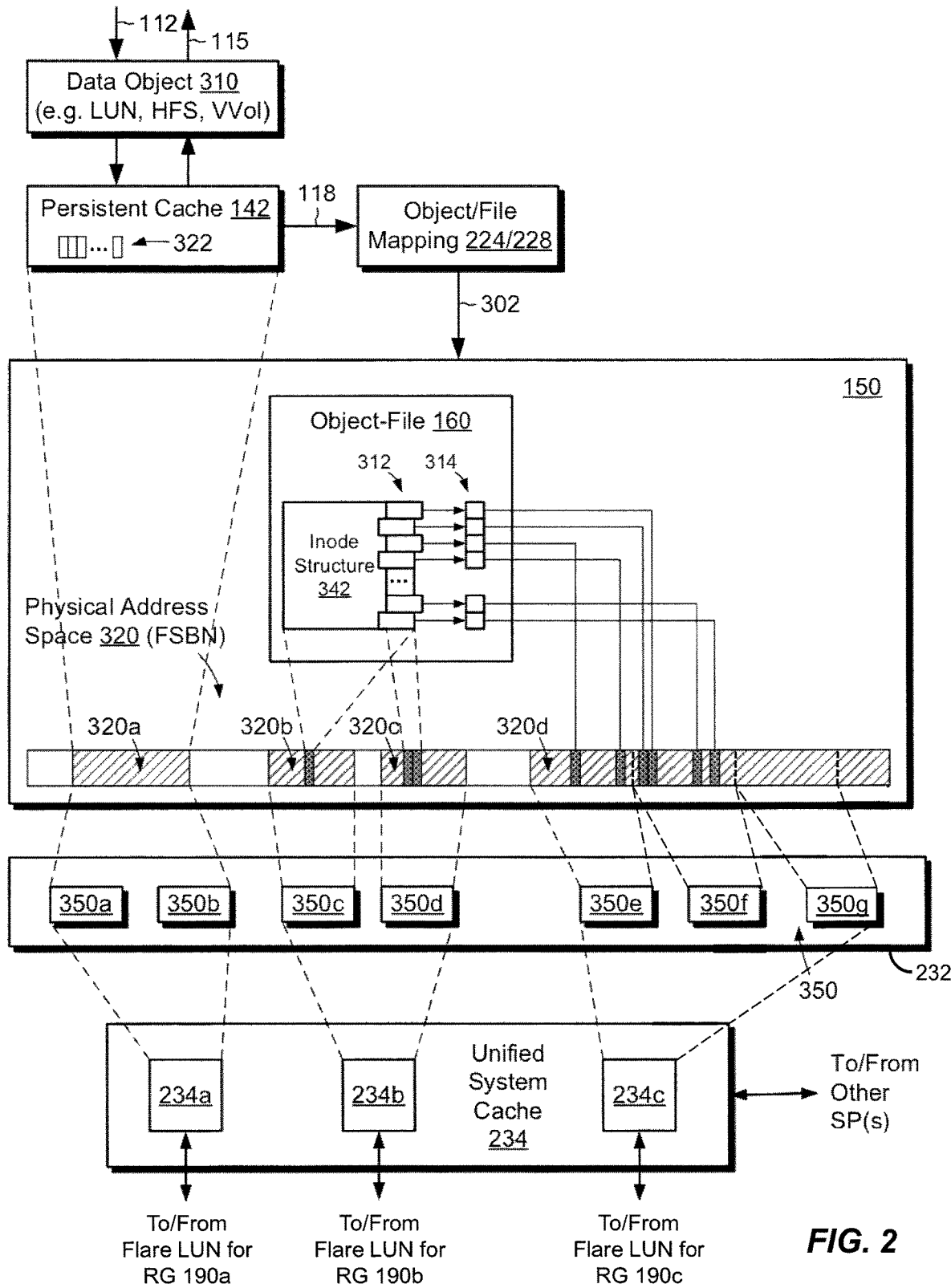
FIG. 2 is a block diagram of an exemplary input/output (IO) stack of a storage processor included in the data storage system of FIG. 1.

FIG. 2 depicts the persistent cache 142 and file system 150 of FIG. 1 in greater detail. In FIG. 2, a data object 310 is shown that represents a host-accessible object, such as, for example, a LUN, a host file system (HFS), or a VVOL. The persistent cache 142 can store data 322 specified in the IO requests 112(1), . . . , 112(N) to be written to the data object 310. The IO requests 112(1), . . . , 112(N) can be converted into mapped IO requests 302 directed to the underlying object-file 160. As shown in FIG. 2, the object-file 160 corresponds to a file within the file system 150 (e.g., a lower-deck file system), and has Mode structure 342 storing information about the object-file 160. The Mode structure 342 includes an Mode (such as from an Mode table of the file system 150), as well as any indirect blocks needed to address the logical address space 162 (see FIG. 1) of the object-file 160.

As further shown in FIG. 2, the file system 150 can have a physical address space 320, which can be indexed by file system block number (FSBN), the FSBN ranging from zero (0) to some large number. The physical address space 320 can have various subspaces 320a, 320b, 320c, 320d, which are supported by respective sets of slices 350 served from a storage pool 232. Each slice 350 corresponds to an increment of storage space having a size such as, for example, 256 megabytes (MB) or 1 gigabyte (GB), which is composed from a portion of a Flare LUN. For example, the subspace 320a may be reserved for the persistent cache 142, and may be backed by slices 350a and 350b. Further, the subspace 320b may be reserved for inodes, and may be backed by a slice 350c; the subspace 320c may be reserved for indirect blocks (IBs), and may be backed by a slice 350d; and, the subspace 320d may be reserved for file data, and may be backed by slices 350e, 350f, and 350g. It is noted, however, that the respective subspaces 320a, 320b, 320c, 320d may be backed by any other suitable number of slices.

It is further noted that the slices 350 can be derived from Flare LUNs, and portions of a unified system cache 234 (see FIG. 2) can be organized by Flare LUN, such that the IO stack 140 can read and write to these portions by specifying a particular Flare LUN and an offset range. In one embodiment, the unified system cache 234 can support the underlying Flare LUNs for reads and writes, and include multiple logical segments 234a, 234b, 234c (e.g., one segment for each Flare LUN). For example, the logical segment 234a may support the Flare LUN for RAID group 190a, which provides the slices 350a to 350b. Similarly, the logical segment 234b may support the Flare LUN for RAID group 190b, which provides the slices 350c and 350d, and the logical segment 234c may support the Flare LUN for RAID group 190c, which provides the slices 350e, 350f, and 350g. The unified system cache 234 can support the persistent cache 142, such that the persistent cache 142 effectively operates as an extension of the unified system cache 234. The unified system cache 234, like the persistent cache 142, can be implemented using battery-backed DRAM, which is mirrored to battery-backed DRAM on the storage processor 120a (or one or more other storage processors). The persistent cache 142 can receive the IO requests 112(1), . . . , 112(N) and store the data 322, such as, for example, via the subspace 320a and into the logical segment 234a of the unified system cache 234. During the flush operation 118, which can occur after many IO requests 112(1), . . . , 112(N) have been cached, the file system 150 can receive the accumulated data 322 in multiple mapped IO requests 302. The mapped IO requests 302 specify the data 322 to be written to multiple logical addresses of the object-file 160.

The inode structure 342 (see FIG. 2) indicates the state of the object-file 160 before any remapping is performed by the L-P mapping manager 152. As shown in FIG. 2, the inode structure 342 can include block pointers 312 that point to blocks 314 storing data of the object-file 160. The blocks 314 can be stored at the physical addresses of the physical address space 320, as indicated by multiple connecting lines from the blocks 314 to the subspace 320d. The block pointers 312 cover the logical addresses to which the mapped IO requests 302 are directed, and therefore should not be regarded as being necessarily contiguous or covering any particular logical address range. Rather, the block pointers 312 may reflect logical addresses of data specified in mapped IO requests 302 in the particular order that the file system 150 receives them. Further, the block pointers 312 point to the physical addresses in no particular pattern. Rather, the mapping between block pointers 312 and the physical addresses may be arbitrary or even random. The blocks 314 can therefore reside on different slices 350 and different stripes of the underlying RAID groups 190. Accordingly, no full-stripe writes are likely to be performed with the block pointers 312 mapped in their current configuration.

Figure 3:
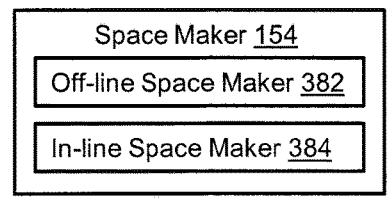
FIG. 3 is a space maker included in the data storage system of FIG. 1, the space maker being configured to perform block relocation/de-allocation for creating contiguous free space that supports full-stripe writes.

Disk utilization in the data storage system 116 can be improved by the off-line (or background) approach that can map data corresponding to diverse logical addresses of a file to contiguous physical addresses, providing ranges of contiguous free blocks (i.e., windows) having lengths equal to that of one or more full RAID stripes of a RAID group. This off-line approach to obtaining contiguous ranges of free blocks in the file system 150 is implemented in the data storage system 116 of FIG. 1 by an off-line space maker 382 (see FIG. 3) included in the space maker 154. The off-line space maker 382 can relocate allocated blocks within a range of the physical address space 320 of the file system 150. The off-line space maker 382 can select one or more slices of storage space within the range of the physical address space 320 as including one or more windows having blocks suitable for such relocation. The range of contiguous free blocks (i.e., the window) can have a length that corresponds to one or more full stripes of the RAID group 190*a*, 190*b*, 190*c* storing content of the file system 150. In response to receiving an IO request containing data to be written to the file system 150, the file system 150 can arrange the data in the range of contiguous free blocks, allowing the data storage system 116 to perform one or more full-stripe writes to write the data to the respective RAID group 190*a*, 190*b*, 190*c*.

Figure 4A:
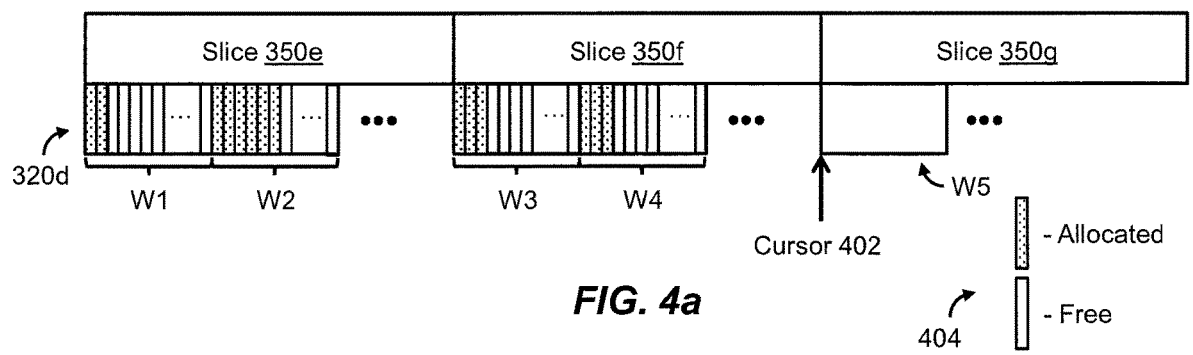
FIGS. 4a and 4b are diagrams illustrating the off-line approach to obtaining contiguous ranges of free space in a file system of the data storage system of FIG. 1.
Figure 4B:
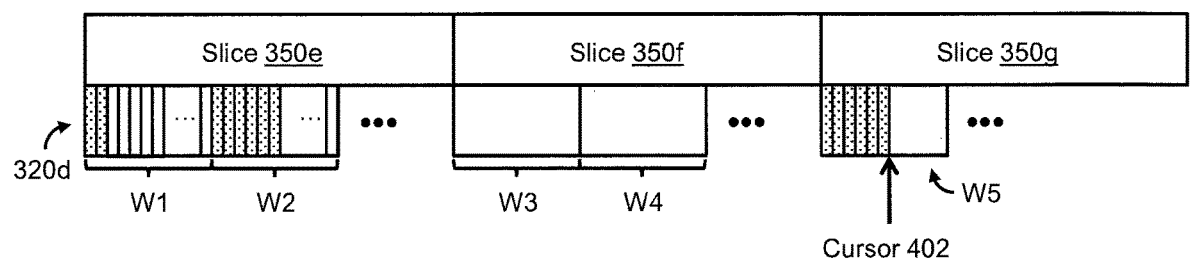

FIGS. 4*a* and 4*b* depict diagrams illustrating an exemplary operation of the off-line space maker 382 for obtaining contiguous ranges of free space in the file system 150 of the data storage system 116 of FIG. 1. As shown in FIG. 4*a*, the data subspace 320*d* of the physical address space 320 can include multiple ranges of contiguous blocks corresponding to windows W1, W2, . . . , W3, W4, . . . . In one embodiment, the windows W1-W4 can have uniform sizes and cover unique ranges of increasing FSBN, with none of the windows W1, W2, . . . W3, W4, . . . overlapping with any other window W1, W2, . . . , W3, W4, . . . . The data subspace 320*d* can therefore be regarded as being divided into the windows W1, W2, . . . , W3, W4, . . . with the respective windows W1, W2, . . . , W3, W4, . . . being provided at predetermined intervals. Although the windows W1, W2, W3, W4 are shown in FIG. 4*a* within the data subspace 320*d*, it is noted that the use of such windows need not be limited to the data subspace 320*d*. Rather, such windows can be employed in other subspaces, such as the subspaces 320*a*, 320*b*, 320*c*. Further, although the windows W1, W2, W3, W4 are illustrated as being uniformly sized, the windows W1, W2, W3, W4 may alternatively be provided in different sizes to correspond to different integer multiples of a full stripe and/or to different stripe sizes. For example, the file system 150 may be supported by multiple RAID groups having different sized stripes, and the windows W1, W2, W3, W4 may be backed by different RAID groups having different sizes.

As shown in FIGS. 4*a* and 4*b* with reference to a legend 404, each window W1, W2, W3, W4 can be either allocated or free. A window is deemed to be allocated if any of the blocks within its range of FSBNs are allocated, and a window is deemed to be free only if none of the blocks within its range of FSBNs are allocated. Because each of the windows W1, W2, W3, W4 has at least some allocated blocks within its range of FSBNs, each window W1, W2, W3, W4 is deemed to be allocated. As shown in FIG. 4*a*, the window W1 has two (2) allocated blocks, the window W2 has six (6) allocated blocks, the window W3 has three (3) allocated blocks, and the window W4 has three (3) allocated blocks. For example, the allocated blocks in the windows W1, W2, W3, W4 may belong to the object-file 160, or any other suitable file(s) or structure(s) in the file system 150. The remaining blocks in the windows W1, W2, W3, W4 are free. As further shown in FIG. 4*a*, the blocks within the windows W1, W2, W3, W4 are sparsely allocated. Sparse allocation of blocks within windows can be a common occurrence in file systems using certain allocation schemes, and can contribute to a file system running short on free windows. The space maker 154 can therefore serve an important role in creating free windows when used in connection with such sparse allocation schemes.

The operation of the off-line space maker 382 for obtaining contiguous ranges of free space in the file system 150 will be further understood with reference to the following illustrative example, as well as FIGS. 4*a* and 4*b*. In this example, the off-line space maker 382 is configured to perform block relocation operations to create free space in at least some of the windows W1, W2, W3, W4. Further, the off-line space maker 382 is triggered to begin operation at predetermined intervals, such as, for example, 1-second intervals. In one embodiment, the operation of the off-line space maker 382 is tied to a timer that triggers the flushing operation 118. Upon being triggered to begin operation, the off-line space maker 382 evaluates a plurality of slices 350, such as, for example, the slices 350*e*, 350*f*, and 350*g*, to determine the best slice 350 in the file system 150 from which to evacuate windows (by freeing or de-allocating blocks within the respective windows of the slice). Specifically, for each slice 350*e*, 350*f*, and 350*g* (see FIG. 4*a*), the off-line space maker 382 determines whether the net number of windows that can be evacuated exceeds a first predetermined threshold value, as follows:

$$\left(\frac{\#\ free\_blocks\_in\_slice}{\#\ blocks\_per\_window}\right) - (\#\ free\_windows\_in\_slice) \geq Threshold, \quad (1)$$

in which "Threshold" corresponds to the first predetermined threshold value, which can range from 1 to 511 (or any other suitable range), assuming each slice includes 512 windows. For example, the number of blocks per window can be equal to 32 or any other suitable number.

In this example, the off-line space maker 382 determines that the slice 350*f* (see FIG. 4*a*) is the best slice 350 in the file system 150 from which to evacuate windows, such as, for example, the windows W3 and W4. To that end, the off-line space maker 382 evacuates the windows W3, W4, in accordance with a file system reclaim (FSR) process, as described in U.S. Pat. No. 9,864,753 issued Jan. 9, 2018 entitled DATA STORAGE SYSTEM WITH ADAPTIVE FILE SYSTEM OVER-PROVISIONING, the disclosure of which is incorporated herein by reference in its entirety. In one embodiment, the off-line space maker 382 queues events in the FSR process for evacuating the windows W3, W4, including identifying allocated blocks in each of the windows W3 and W4, and, for each identified block, directing the file system 150 to perform the following operations: (i) allocate a free block in another window (e.g., a window W5 in the slice 350*g*; see FIG. 4*a*), (ii) copy the contents (e.g., the file data) of the identified block to the newly allocated free block in the window W5, (iii) update all block pointers in the file system 150 pointing to the identified block (e.g., in the inode structure 342) such that the block pointers point to the free block instead of pointing to the identified block, (iv) update metadata of the file system 150 to designate the identified block as now being free, and (v) update metadata of the file system 150 to designate the formerly free block in the window W5 as being allocated. It is noted that the file system 150 can perform these operations at the direction of the off-line space maker 382 in any suitable order for each allocated block in the windows W3 and W4. It is further noted that the file system 150 can provide a cursor 402 for assisting with the block allocation. For example, the cursor 402 can start at an initial, low value of FSBN, and advance one allocation unit (AU) (e.g., one block) at a time to subsequent FSBNs as the block allocation proceeds.

Having evacuated the windows W3, W4 in the slice 350f in accordance with the FSR process, the off-line space maker 382 is triggered to cease operation, for example, in the event either of the following criteria is satisfied:

$$\left(\frac{\text{\# free\_blocks\_in\_slice}}{\text{\# blocks\_per\_window}}\right) \le (\text{\# free\_windows\_in\_slice}), \text{ or} \quad (2)$$

$$\left(\frac{\text{\# free\_blocks\_in\_slice}}{\text{\# blocks\_per\_window}}\right) \le HMW, \quad (3)$$

in which "HWM" corresponds to a "high water mark" value, which can be equal to 6,000 or any other suitable value.

FIG. 4b depicts the windows W3, W4, and W5 after operation of the off-line space maker 382. As shown in FIG. 4b, all allocated blocks in the windows W3 and W4 have been relocated to the window W5, and the windows W3 and W4 are now free. Accordingly, the operation of the off-line space maker 382 has created two (2) new free windows, namely, the window W3 and the window W4, which may serve as locations for arranging data for performing full-stripe writes.

Disk utilization in the data storage system 116 can be further improved by supplementing the off-line (or background) approach implemented by the off-line space maker 382 with the in-line (or foreground) approach to obtaining contiguous ranges of free space in the file system 150. This in-line approach is implemented in the data storage system 116 of FIG. 1 by an in-line space maker 384 (see FIG. 3) included in the space maker 154. The in-line space maker 384 can select windows having blocks suitable for relocation at a time when one or more blocks are freed (or de-allocated) within the respective windows. By supplementing the off-line or background approach to obtaining contiguous ranges of free space in the file system 150 with the in-line or foreground approach, a more efficient determination of windows having blocks suitable for relocation can be achieved, thereby conserving processing resources of the data storage system 116.

Figure 5:
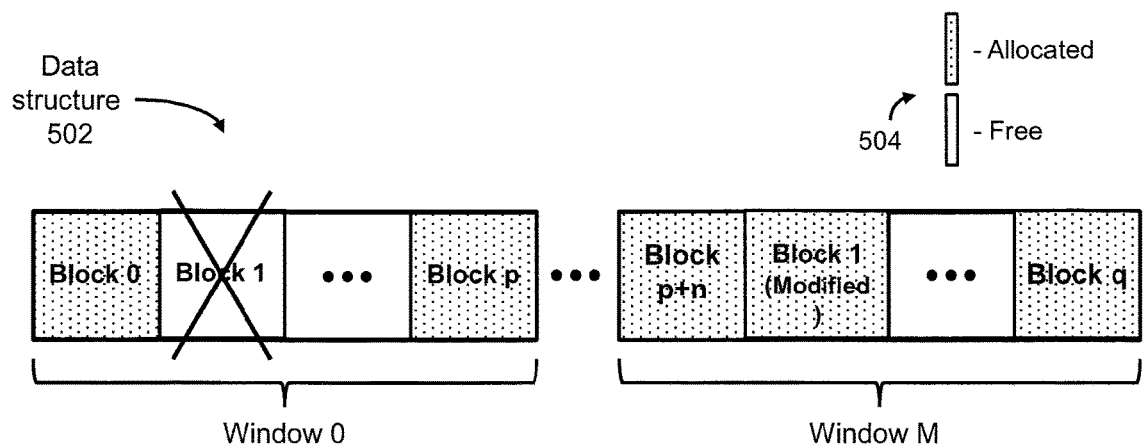
FIG. 5 is a diagram of an exemplary data structure of windows containing allocated blocks and/or free (or de-allocated) blocks sequentially written to log structured storage within the data storage system of FIG. 1.

FIG. 5 is a diagram of an exemplary data structure 502 of windows 0, . . . , M, containing allocated blocks and/or free (or de-allocated) blocks sequentially written to the persistent cache 142 configured as log structured storage. As shown in FIG. 5, one or more blocks, such as, for example, block 0, block 1, . . . , block p, can be sequentially written as the data 322 to the head of a log corresponding to a window 0. Once the window 0 becomes full, the head of the log can advance to an adjacent or non-adjacent window with free storage space (e.g., a window M), and subsequent blocks, such as, for example, block p+n, block 1 (modified), . . . , block q, can be sequentially written as the data 322 to the head of the log corresponding to the window M. It is noted that subsequent modifications to (or overwrites of) the blocks 0-p in window 0 can be written to the window M, resulting in a corresponding locations of the respective blocks in a virtual volume (VVOL) to be overwritten or needing to be unmapped and freed. For example, a modification to (or overwrite of) the block 1 originally written to the window 0 may be written as the block 1 (modified) to the window M. As a result, the block 1 written to the window 0 is no longer valid (as indicated by a cross "X" drawn through the block 1; see FIG. 5), and may therefore be freed or de-allocated.

As shown in FIG. 5 with reference to a legend 504, the block 0, the block 1, . . . , the block p in window 0 are each depicted as being allocated, and the block p+n, the block 1 (modified), . . . , the block q in window M are also each depicted as being allocated. However, due to the modification to (or overwrite of) the block 1 having been written as the block 1 (modified) to the window M, the block 1 in window 0 is depicted as being free or de-allocated. It is noted that, after the block 1 in the window 0 has been freed or de-allocated, a pointer for the block 1 in the window 0 can be updated to point to the block 1 (modified) in the window M. In the in-line or foreground approach, the in-line space maker 384 can make a determination as to whether the window 0 has any remaining blocks suitable for relocation at the time the block 1 in the window 0 is freed or de-allocated. In this way, determinations regarding whether or not to evacuate windows can be made proactively in the IO path, at the time a respective window is freed or de-allocated in log structured storage.

Figure 6A:
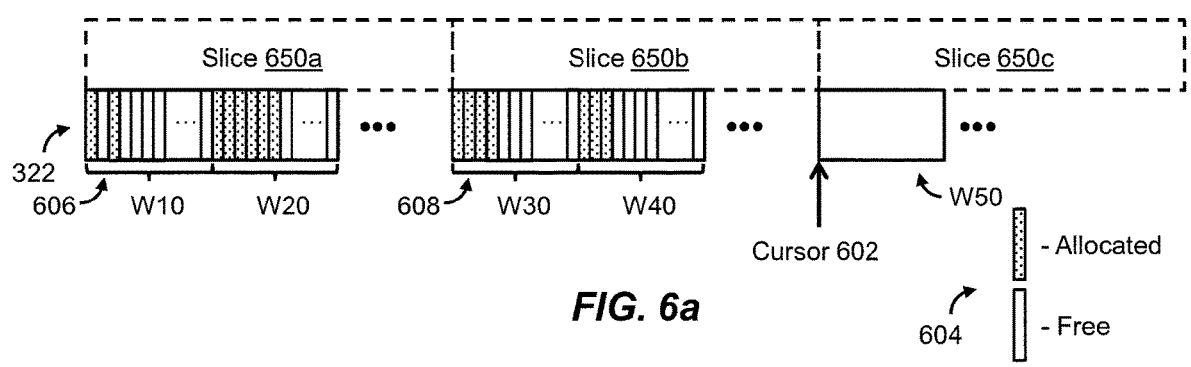
FIGS. 6a and 6b are diagrams illustrating the in-line approach to obtaining contiguous ranges of free space in a file system of the data storage system of FIG. 1.
Figure 6B:
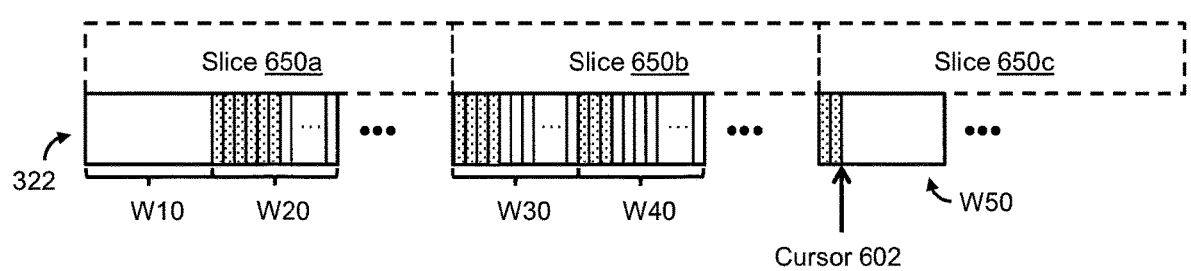

FIGS. 6a and 6b depict diagrams illustrating an exemplary operation of the in-line space maker 384 for obtaining contiguous ranges of free space in the file system 150 of the data storage system 116 of FIG. 1. As shown in FIG. 6a, the log structured data 322 of the persistent cache 142 can include multiple ranges of contiguous blocks corresponding to windows W10, W20, . . . , W30, W40, . . . . Further, the log structured data 322 can be regarded as being divided into the windows W10, W20, . . . , W30, W40, . . . , with the respective windows W10, W20, . . . , W30, W40, . . . being provided at predetermined intervals. Although the windows W10, W20, . . . , W30, W40, . . . are illustrated as being uniformly sized, the windows W10, W20, . . . , W30, W40, . . . may alternatively be provided in different sizes.

As shown in FIGS. 6a and 6b with reference to a legend 604, each window W10, W20, . . . , W30, W40 can be either allocated or free. Because each of the windows W10, W20, W30, W40 has at least some allocated blocks, each window W10, W20, W30, W40 is deemed to be allocated. As shown in FIG. 6a, the window W10 has two (2) allocated blocks, the window W20 has six (6) allocated blocks, the window W30 has four (4) allocated blocks, and the window W40 has three (3) allocated blocks. The remaining blocks in the windows W10, W20, W30, W40 are free. As further shown in FIG. 6a, the blocks within the windows W10, W20, W30, W40 are sparsely allocated.

The operation of the in-line space maker 384 for obtaining contiguous ranges of free space in the file system 150 will be further understood with reference to the following illustrative example, as well as FIGS. 6a and 6b. In this example, the in-line space maker 384 is configured to perform block relocation operations to create free space in at least some of the windows W10, W20, W30, W40. Further, whereas the off-line space maker 382 is triggered to begin operation at predetermined intervals, the in-line space maker 384 can be configured to operate continuously during operation of the file system 150. In this example, it is assumed that the block in the window W10 corresponding to reference numeral 606 has been freed or de-allocated due to a modification of the block 606 having been written as the block in the window W30 corresponding to reference numeral 608. Once the block 606 in the window W10 has been freed or de-allocated, the in-line space maker 384 makes a determination as to whether the window W10 has any remaining blocks suitable for relocation. For example, the in-line space maker 384 may make such a determination regarding the remaining blocks in the window W10 by referring to a block allocation bitmap stored as metadata in the file system 150. Such a block allocation bitmap can include consecutive bits that indicate allocation statuses of consecutive blocks in the respective windows W10, W20, W30, W40 of the log structured data 322.

Having referred to the block allocation bitmap, the in-line space maker 384 can determine whether or not to evacuate the window W10 based on whether the number of remaining allocated blocks in the window W10 is less than a second predetermined threshold, such as, for example, five (5), ten (10), or any other suitable value. If the in-line space maker 384 determines that the number of remaining allocated blocks in the window W10 is less than the second predetermined threshold, then the in-line space maker 384 can evacuate the window W10 (by freeing or de-allocating the remaining blocks in the window W10). To that end, the in-line space maker 384 evacuates the window W10, in accordance with the FSR process. In one embodiment, the in-line space maker 384 queues an event in the FSR process for evacuating the window W10, including identifying allocated blocks in the window W10, and, for each identified block, directing the file system 150 to perform the following operations: (i) allocate a free block in another window (e.g., a window W50; see FIG. 6a), (ii) copy the contents (e.g., the file data) of the identified block to the newly allocated free block in the window W50, (iii) update all block pointers in the file system 150 pointing to the identified block, (iv) update metadata of the file system 150 to designate the identified block as now being free, and (v) update metadata of the file system 150 to designate the formerly free block in the window W50 as being allocated. It is noted that the file system 150 can perform these operations at the direction of the in-line space maker 384 in any suitable order for each allocated block in the window W10, and that the file system 150 can provide a cursor 602 for assisting with the block allocation. It is further noted that the windows W10, W20, . . . can correspond to a slice 650a, the windows W30, W40, . . . can correspond to a slice 650b, and the window W50, . . . can correspond to a slice 650c.

FIG. 6b depicts the windows W10 and W50 after operation of the in-line space maker 384. As shown in FIG. 6b, all allocated blocks in the window W10 have been relocated to the window W50, and the window W10 is now free. Accordingly, the operation of the in-line space maker 384 has created one (1) new free window, namely, the window W10, which may serve as a location for arranging data for performing full-stripe writes. Because the operation of the in-line space maker 384 resulted in the relocation of fewer blocks (i.e., the two (2) blocks from the window W10; see FIGS. 6a and 6b) than the operation of the off-line space maker 382 (i.e., the six (6) blocks from the windows W3 and W4; see FIGS. 4a and 4b), processing resources of the data storage system 106 are conserved.

Figure 7:
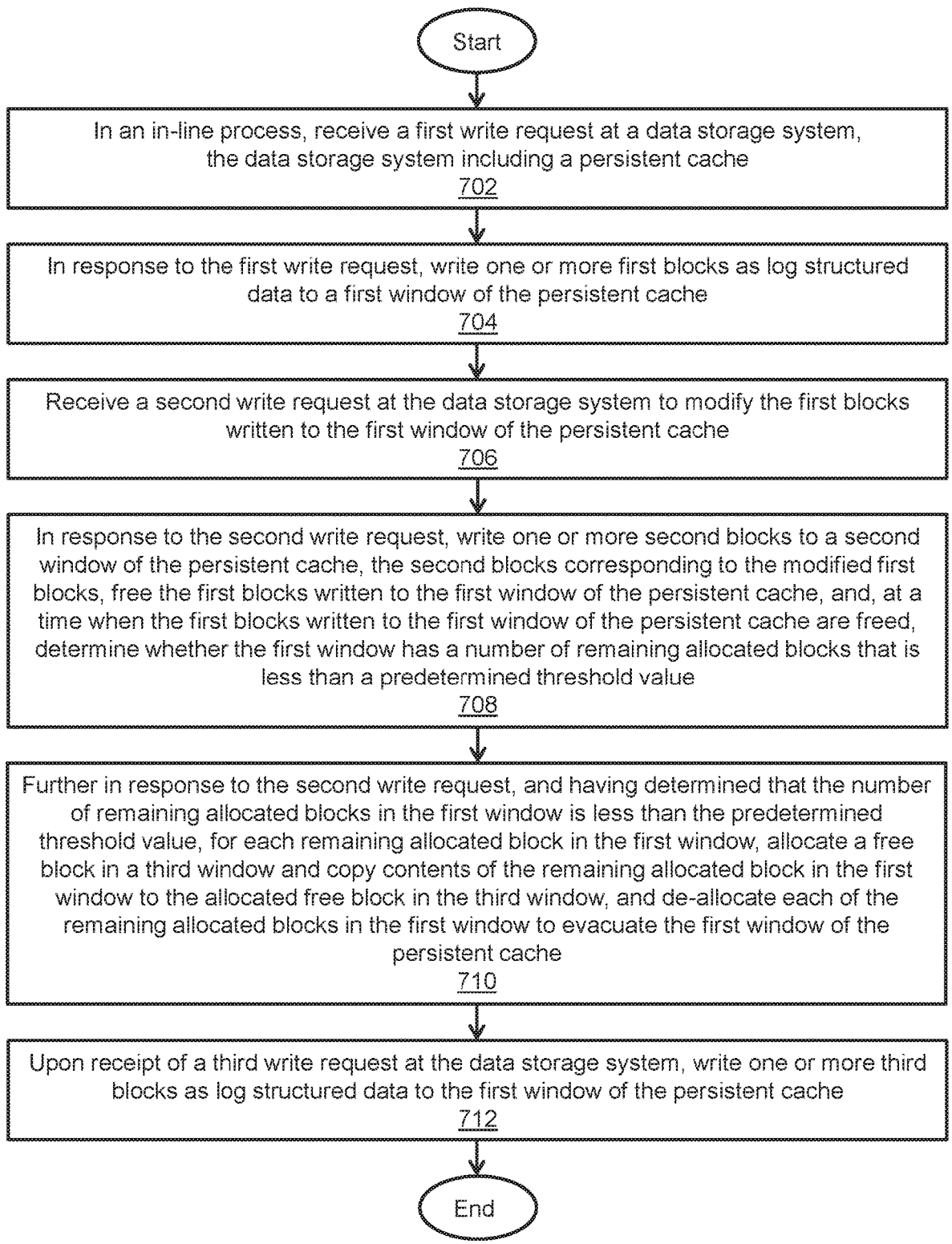
FIG. 7 is a flow diagram of an exemplary method of obtaining contiguous ranges of free space in a file system of the data storage system of FIG. 1.

A method of obtaining contiguous ranges of free space in the file system 150 of the data storage system 116 is described below with reference to FIGS. 1 and 7. As depicted in block 702 (see FIG. 7), in an in-line process, a first write request is received at the data storage system 116 (see FIG. 1), in which the data storage system 116 includes the persistent cache 142. As depicted in block 704, in response to the first write request, one or more first blocks are written as log structured data to a first window of the persistent cache 142. As depicted in block 706, a second write request is received at the data storage system 116 to modify the first blocks written to the first window of the persistent cache 142. As depicted in block 708, in response to the second write request, one or more second blocks are written to a second window of the persistent cache 142, the second blocks corresponding to the modified first blocks, the first blocks written to the first window of the persistent cache 142 are freed, and, at a time when the first blocks written to the first window of the persistent cache 142 are freed, a determination is made as to whether the first window has a number of remaining allocated blocks that is less than a predetermined threshold value. As depicted in block 710, further in response to the second write request, and having determined that the number of remaining allocated blocks in the first window is less than the predetermined threshold value, for each remaining allocated block in the first window, a free block is allocated in a third window and contents of the remaining allocated block in the first window are copied to the allocated free block in the third window, and each of the remaining allocated blocks in the first window are de-allocated to evacuate the first window of the persistent cache 142. As depicted in block 712, upon receipt of a third write request at the data storage system 116, one or more third blocks are written as log structured data to the first window of the persistent cache 142.

Having described the foregoing in-line (or foreground) approach and off-line (or background) approach to obtaining contiguous ranges of free space in a file system of a data storage system, other alternative embodiments and/or variations can be made and/or practiced. For example, it was described herein that events can be queued in an FSR process for evacuating one or more windows. In one or more alternative embodiments, before queuing such events in the FSR process, one or more determinations can be made as to whether the FSR process is currently being employed to clean the respective windows, to evacuate the respective windows from a slice, or any other suitable determination to avoid contention with the respective windows. In the event it is determined that contention with the respective windows is a possibility, one or more events can be de-queued from the FSR process, as needed, to avoid such contention.

It was further described herein that the in-line (or foreground) approach to obtaining contiguous ranges of free space in a file system can be employed to make a determination as to whether a window in persistent cache has any remaining blocks suitable for relocation at the time one or more blocks in the window are freed or de-allocated. In one or more alternative embodiments, such a determination can be made for two or more adjacent windows in the persistent cache in an effort to provide an increased contiguous range of free space in the file system for promoting full-stripe writes.

Other alternative embodiments can be directed to a computer program product, which stores instructions that, when executed by one or more processing units of a data storage system, cause the processing units to perform a method of managing data storage, such as the method described above. Some embodiments involve activity that is performed at a single location, while other embodiments involve activity that is distributed over multiple locations, e.g., over a network.

Although features of the foregoing in-line (or foreground) and off-line (or background) approaches to obtaining contiguous ranges of free space in a file system are shown and described with reference to particular embodiments hereof, such features may be included and hereby are included in any of the disclosed embodiments and their variants. Thus, it is understood that features disclosed in connection with any embodiment are included as variants of any other embodiment. In addition, such features or portions thereof may be embodied as a non-transient computer-readable storage medium, such as a magnetic disk, magnetic tape, compact disk, DVD, optical disk, flash memory, application specific integrated circuit (ASIC), field programmable gate array (FPGA). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments of the invention have been particularly shown and described, it will be understood by those skilled in the art that various changes in form and details may be made therein without departing from the scope of the invention as defined by the appended claims.

What is claimed is:

1. In a data storage system, a method of obtaining at least one contiguous range of free space, comprising:
    performing a background process to obtain at least one contiguous range of free space, the background process comprising:
        identifying one or more allocated blocks in one or more windows of a cache; and
        relocating and de-allocating the one or more allocated blocks in the one or more windows to evacuate the one or more windows and obtain one or more contiguous ranges of free space; and
    supplementing the background process with a foreground process to obtain at least one additional contiguous range of free space, the foreground process comprising:
        receiving a first write request;
        in response to the first write request, writing one or more first blocks as log structured data to a first window of the cache;
        de-allocating one or more blocks previously written as log structured data to a previous window of the cache, the one or more previously written blocks corresponding to the one or more first blocks, respectively;
        at a time when the one or more previously written blocks are de-allocated, proactively determining whether the previous window includes a number of remaining allocated blocks that is less than a first predetermined threshold value; and
        having proactively determined that the previous window includes a number of remaining allocated blocks that is less than the first predetermined threshold value, relocating and de-allocating the remaining allocated blocks to evacuate the previous window and obtain the at least one additional contiguous range of free space.

2. The method of claim 1 wherein the identifying of the one or more allocated blocks includes determining whether a net number of the one or more windows of the cache exceeds a second predetermined threshold value.

3. The method of claim 2 wherein the identifying of the one or more allocated blocks is performed subsequent to determining that the net number of the one or more windows of the cache exceeds the second predetermined threshold value.

4. The method of claim 1 wherein the writing of the one or more first blocks includes sequentially writing the one or more first blocks to a head of a log corresponding to the first window of the cache.

5. A data storage system, comprising:
    a memory;
    a cache; and
    a storage processor configured to execute instructions out of the memory to:
        perform a background process to obtain at least one contiguous range of free space, the background process comprising:
            identifying one or more allocated blocks in one or more windows of a cache; and
            relocating and de-allocating the one or more allocated blocks in the one or more windows to evacuate the one or more windows and obtain one or more contiguous ranges of free space; and
        supplement the background process with a foreground process to obtain at least one additional contiguous range of free space, the foreground process comprising:
            receiving a first write request;
            in response to the first write request, writing one or more first blocks as log structured data to a first window of the cache;
            de-allocating one or more blocks previously written as log structured data to a previous window of the cache, the one or more previously written blocks corresponding to the one or more first blocks, respectively;
            at a time when the one or more previously written blocks are de-allocated, proactively determining whether the previous window includes a number of remaining allocated blocks that is less than a first predetermined threshold value; and
            having proactively determined that the previous window includes a number of remaining allocated blocks that is less than the first predetermined threshold value, relocating and de-allocating the remaining allocated blocks to evacuate the previous window and obtain the at least one additional contiguous range of free space.

6. The data storage system of claim 5 further comprising:
    a storage pool including a plurality of slices of data storage.

7. The data storage system of claim 5 wherein the storage processor is further configured to execute the instructions out of the memory:
to determine, in the background process, whether a net number of the one or more windows of the cache exceeds a second predetermined threshold value.

8. The data storage system of claim 7 wherein the storage processor is further configured to execute the of instructions out of the memory:
to perform, in the background process, the identifying of the one or more allocated blocks subsequent to determining that the net number of the one or more windows of the cache exceeds the second predetermined threshold value.

9. The data storage system of claim 5 wherein the storage processor is further configured to execute the first set of instructions:
to sequentially write the one or more first blocks to a head of a log corresponding to the first window of the cache.

10. A computer program product having a non-transitory computer readable medium that stores a set of instructions that, when carried out by computerized circuitry, cause the computerized circuitry to perform a method of obtaining at least one contiguous range of free space in a data storage system, the method comprising:
performing a background process to obtain at least one contiguous range of free space, the background process comprising:
identifying one or more allocated blocks in one or more windows of a cache; and
relocating and de-allocating the one or more allocated blocks in the one or more windows to evacuate the one or more windows and obtain one or more contiguous ranges of free space; and
supplementing the background process with a foreground process to obtain at least one additional contiguous range of free space, the foreground process comprising:
receiving a first write request;
in response to the first write request, writing one or more first blocks as log structured data to a first window of the cache;
de-allocating one or more blocks previously written as log structured data to a previous window of the cache, the one or more previously written blocks corresponding to the one or more first blocks, respectively;
at a time when the one or more previously written blocks are de-allocated, proactively determining whether the previous window includes a number of remaining allocated blocks that is less than a first predetermined threshold value; and
having proactively determined that the previous window includes a number of remaining allocated blocks that is less than the first predetermined threshold value,
relocating and de-allocating the remaining allocated blocks to evacuate the previous window and obtain the at least one additional contiguous range of free space.

11. The method of claim 10 wherein the identifying of the one or more allocated blocks includes determining whether a net number of the one or more windows of the cache exceeds a second predetermined threshold value.

12. The method of claim 1 further comprising:
having evacuated the previous window, proactively determining whether a window of the cache adjacent to the previous window has a number of allocated blocks that is less than the first predetermined threshold value.

13. The method of claim 12 further comprising:
having proactively determined that a window of the cache adjacent to the previous window has a number of allocated blocks that is less than the first predetermined threshold value, evacuating the window of the cache adjacent to the previous window to obtain an increased contiguous range of free space that includes the evacuated previous window and the evacuated window of the cache adjacent to the previous window.

\* \* \* \* \*